United States Patent [19]

Horn et al.

[11] Patent Number: 5,464,472

[45] Date of Patent: Nov. 7, 1995

[54] FINE AQUEOUS DISPERSION OF AN ORGANOPHILIC SHEET SILICATE

[75] Inventors: Ute Horn, Dornburg; Guido Dessauer, Tutzing, both of Germany

[73] Assignee: Hoechst Aktiengesellschaft, Frankfurt, Germany

[21] Appl. No.: 265,206

[22] Filed: Jun. 24, 1994

[30] Foreign Application Priority Data

Jun. 26, 1993 [DE] Germany .................... 43 21 376.6

[51] Int. Cl.⁶ ..................... C09D 1/00; C09D 101/26; C09D 103/08; C09D 105/00; C09D 105/04

[52] U.S. Cl. ............... 106/287.34; 106/162; 106/197.1; 106/208; 106/213; 106/287.17; 162/175; 162/177; 162/178; 252/311

[58] Field of Search ............... 252/311; 106/162, 106/197.1, 208, 213, 287.17, 287.34; 162/175, 177, 178

[56] References Cited

U.S. PATENT DOCUMENTS

| 4,867,844 | 9/1989 | Dessauer | 162/135 |
| 5,294,254 | 3/1994 | Dessauer et al. | 106/487 |

FOREIGN PATENT DOCUMENTS

| 0192252 | 8/1986 | European Pat. Off. . |
| 0542215 | 5/1993 | European Pat. Off. . |

*Primary Examiner*—David Brunsman
*Attorney, Agent, or Firm*—Connolly & Hutz

[57] ABSTRACT

The present invention relates to a fine aqueous dispersion of an organophilic sheet silicate, consisting essentially of a sheet silicate capable of cation exchange and a quaternary organic onium salt reacted therewith, which dispersion comprises from 3 to 30% by weight, based on the organophilic sheet silicate, of a water-soluble, natural polymer and/or a derivative thereof.

17 Claims, No Drawings

FINE AQUEOUS DISPERSION OF AN ORGANOPHILIC SHEET SILICATE

EP-A-0 542 215 describes a fine aqueous dispersion of an organophilic sheet silicate, which comprises a sheet silicate capable of cation exchange and a quaternary organic onium salt reacted therewith and from 3 to 30% by weight, based on the organophilic sheet silicate, of polyvinyl alcohol. This fine dispersion is suitable as a coating composition for paper and cardboard and also as a lubricant additive for conventional coating compositions. To produce the dispersion, polyvinyl alcohols are also used in addition to the precipitate, by which is meant the organophilic sheet silicate after mechanical separation of the water. In a preferred embodiment of the production process, both precipitate and polyvinyl alcohol are introduced into an aqueous medium at a temperature in the range between 90° and 98° C. while stirring with high shear force. The mixture is stirred until the polyvinyl alcohol is completely dissolved and until the desired fine degree of dispersion of the precipitate with the bound interlaminar water is also obtained.

Although the use of polyvinyl alcohol gives perfectly good results from the point of view of printing, the abovementioned production process has various disadvantages. It has thus been found that the heating and sometimes long stirring, particularly under high shear forces, required for the production of the dispersion are process measures which should be largely avoided.

It is an object of the present invention to provide a fine aqueous dispersion which gives comparable results to the fine dispersions specified in EP-A-0 542 215 and in whose production process the abovementioned disadvantages do not necessarily have to be accepted.

Surprisingly, it has been found that this can be achieved by the use of water-soluble, natural polymers in place of the polyvinyl alcohol.

The invention provides a fine aqueous dispersion of an organophilic sheet silicate, consisting essentially of a sheet silicate capable of cation exchange and a quaternary organic onium salt reacted therewith, which dispersion comprises from 3 to 30% by weight, based on the organophilic sheet silicate, of a water-soluble, natural polymer and/or a derivative thereof.

The invention likewise provides a process for producing a fine dispersion of an organophilic sheet silicate in an aqueous medium, starting from a sheet silicate capable of cation exchange and a quaternary organic onium salt reacted therewith, which comprises stirring the expressed reaction product of sheet silicate and onium salt into an aqueous solution of a water-soluble, natural polymer and/or a derivative thereof or stirring the reaction product of sheet silicate and onium salt and the watersoluble natural polymer and/or the derivative thereof simultaneously into the aqueous medium.

These organophilic sheet silicates are obtained by methods known per se, as are also described in the article by Prof. Dr. A. Weiss, Angew. Chem. Vol. 75, No. 2, 113–148 (1963) with the title "Organische Derivate der glimmerartigen Schichtsilikate" and in the N. L. Rheology Handbook of National Lead Inc. Industries, New York 1983 with the title "Leitfaden für den Einsatz rheologischer Additive" [Guidelines for the use of rheological additives] (German translation published by N. L. Kronos Titan GmbH, Leverkusen) but which are not dried.

Suitable sheet silicates capable of cation exchange are all synthetic or natural sheet silicates, which can contain up to from 12 to 20% by weight of impurities in the form of other minerals such as feldspar. Such sheet silicates are, for example, montmorillonite, hectorite, saponite, sauconite, heidellite, nontronite and preferably bentonite.

Suitable quaternary organic onium salts are, in particular, compounds of the formula

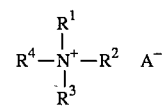

where $R^1$ and $R^2$ are $C_8$–$C_{22}$-alkyl, $C_8$–$C_{22}$-alkenyl or benzyl and $R^3$ and $R^4$ are $C_1$–$C_4$-alkyl or $C_1$–$C_4$-hydroxyalkyl and $A^-$ is an anion, preferably chloride. Particular preference is given to the compounds dimethyldistearylammonium chloride and benzyldimethylstearylammonium chloride. When the exchangeable cations of the sheet silicate are replaced by the quaternary organic onium ion, water is removed. This is carried out by the conventional methods of separation technology, e.g. by filtration or expressing. The precipitate obtained after the separation of water comprises from about 70 to 80% by weight of water. The term precipitate means the organophilic sheet silicate after the separation of the water. In the process of the invention, the precipitate is preferably used for producing the fine aqueous dispersion.

For the fine aqueous dispersion of the invention, suitable water-soluble, natural polymers and/or derivatives thereof are preferably:

1. Water-soluble cellulose ethers:

The viscosity limits of these cellulose ethers are usually from 10 to 500,000 mPa.s, in particular from 20 to 150,000 mPa.s (measured as a 2% strength aqueous solution in distilled water using a Höppler falling sphere viscometer at 20° C.). The mean molecular weight is usually between 5,000 and 500,000.

Examples which may be mentioned are: methylcellulose, methylhydroxyethylcellulose, methylhydroxypropylcellulose, hydroxyethylcellulose, hydroxyethylhydroxypropylcellulose, carboxymethylcellulose or carboxymethylhydroxycellulose. Preference is given to hydroxyethylcellulose, methylhydroxyethylcellulose and sodium carboxymethylcellulose.

The most important cellulose ethers in practice are shown in Table I together with their etherification data. The average degree of substitution (AS) indicates the average number of alkyl groups (here: methyl, ethyl and propyl) per anhydroglucose unit. The molar degree of substitution (MS) indicates the average number of hydroxyalkyl groups (here: ethyl and propyl) per anhydroglucose unit.

In the alkoxy-hydroxypropylhydroxyethylcellulose shown in Table I, the alkoxy group comprises from 2 to 8 carbon atoms, which can be linked to one another linearly or in a branched manner and make up from 0.05 to 50% by weight of the substituted cellulose ether.

TABLE I

| Water-soluble cellulose ethers | | | |
|---|---|---|---|
| | AS | | MS |
| Methylcellulose | 1.4–2.2 | | |
| Methylhydroxyethylcellulose | 0.5–0.7 | | 0.05–0.5 |
| Methylhydroxypropylcellulose | 0.5–0.7 | | 0.1–1.0 |
| Hydroxyethylcellulose | — | | 0.5–0.7 |
| Hydroxyethylhydroxypropyl- | | MS HE: | 0.9–1.2 |

TABLE I-continued

| Water-soluble cellulose ethers | | |
| --- | --- | --- |
| cellulose | MS HP: | 0.6–0.9 |
| Hydroxypropylcellulose | — | 2.0–3.5 |
| Ethylhydroxyethylcellulose | 0.7–1.2 | 0.8–2.7 |
| Carboxymethylcellulose-Na | 0.5–1.5 | — |
| Carboxymethylhydroxyethyl-cellulose | 0.3–0.6 | 0.3–2.3 |
| Alkoxy-hydroxypropyl-hydroxy-ethylcellulose | — | 1.5–3.5 |

| | AS OCH$_3$ | MS |
| --- | --- | --- |
| Carboxymethylated methylhydroxyethyl- or | 1.3–2.0 | 0.05–0.5 |
| methylhydroxypropylcellulose | 1.3–2.2 | 0.1–1.0 |

2. Starch ethers

The data for starch ethers preferably used are shown in Table II.

TABLE II

| Starch ether | MS | AS | Viscosity* measured as 2% strength aqueous solution |
| --- | --- | --- | --- |
| Hydroxypropylstarch | 0.1–0.8 | — | 5–100 |
| Carboxymethylstarch | — | 0.1–0.8 | 5–100 |
| Hydroxypropylcarboxy-methylstarch | 0.1–0.8 | 0.1–0.5 | 5–500 |

*Measurement using Höppler falling sphere viscometer at 20° C. in distilled water.

3. Gram gum derivatives

Table III below shows the preferred guar gum derivatives.

TABLE III

| | |
| --- | --- |
| Guar endosperm flour (natural galactomannan) Viscosity (1% in water): (measured using Brookfield RVT, 25° C., 20 rpm) | 100–20,000 mPa · s |
| Carboxymethylguar Viscosity (3% in water): | 100–20,000 mPa · s |
| Hydroxypropylguar Viscosity (1% in water): | 100–10,000 mPa · s |
| Carboxymethylhydroxypropylguar Viscosity (1% in water): | 100–20,000 mPa · s |
| Cationized guar (quaternary substitution AS ca. 0.13) Viscosity (1% in water): | 100–20,000 mPa · s |

4. Xanthan gum derivatives

These compounds are anionic polysaccharides which are produced by fermentation and extraction from Xanthimonas campestris. The viscosity is 100–10,000 mPa.s (measured using Brookfield RVT, 25° C., 20 rpm, 1% strength aqueous solution).

5. Alginates

Designation for the salts and esters of alginic acid. Low-viscosity ammonium or sodium salts of alginic acid are preferably used. The alginates are usually used together with cellulose ethers and/or starch ethers.

In the process of the invention, the water-soluble, natural polymer and/or the derivative thereof is introduced while stirring into a heated or unheated aqueous medium and the mixture is stirred at a temperature of up to 50° C., preferably in the range from 20° C. to 50° C., until complete solution has occurred. Particularly preferably, the water-soluble, natural polymer and/or the derivative thereof is introduced at a temperature between 30° C. and 45° C. while stirring. Further suitable constituents of the aqueous medium are water-miscible liquids, e.g. anti-foaming agents and/or surfactants. The aqueous medium preferably comprises water without addition of water-miscible liquids.

Likewise while stirring, the precipitate is introduced into the solution, with the temperature of the dispersion lying in the abovementioned temperature range. It is particularly advantageous for the stirring to be carried out with high shear force. The addition of the precipitate to the polymer solution is carried out by known methods, in the simplest case by plain addition. The shear procedure is continued until the desired fine degree of dispersion is achieved (process A). It is likewise possible to introduce the water-soluble, natural polymer and/or a derivative thereof simultaneously with the precipitate into a heated or unheated aqueous medium while stirring, preferably with high shear force, and to stir until the desired fine degree of dispersion is achieved (process B). The simultaneous introduction is likewise carried out according to known measures, in the simplest case by plain addition.

The dispersion of the precipitate is carried out by methods known per se. Depending on the particle size of the particles present, it is appropriate to first carry out the dispersion of the precipitate in the solution using a normal propeller stirrer and to subsequently carry out the fine dispersion. The fine dispersion of the precipitate is carried out using suitable devices, such as a colloid mill, the Ultraturrax (manufactured by: Jahnkeund Kunkel) or a "Caddy Mill" stirrer. In the fine dispersions of the invention, the organophilic sheet silicates are present in a mean particle size of below 20 μm, preferably between 5 and 0.5 μm.

The fine aqueous dispersions of the invention generally possess a total solids content of from 12 to 23% by weight, based on the anhydrous fine dispersion. The content of water-soluble, natural polymer and/or derivative thereof in the fine aqueous dispersion lies between 3 and 30% by weight, preferably between 12 and 17% by weight, based on the anhydrous organophilic sheet silicate.

The fine dispersions of the invention can be used directly for coating paper and cardboard, with it being advisable to preserve the fine dispersions produced by known measures. The preservation can be carried out by addition of suitable disinfectants such as hydrogen peroxide or quaternary ammonium salts having bactericidal properties. To the fine dispersions of the invention can be added, prior to coating, optical whiteners known to those skilled in the art, preferably cationic or only slightly ionogenic optical whiteners, to suppress the yellow cast occurring in aqueous coatings.

The fine dispersions of the invention also possess a high stability and storage life and are suitable for the production of coating compositions for paper and cardboard, in particular pigment-containing coating compositions, which then likewise possess a good stability and storage life.

The fine dispersions of the invention are suitable for both one-sided and two-sided coating of paper and cardboard. They are suitable for coating all types of papers, as are required in gravure printing, web offset printing, sheet-fed offset printing and letterpress printing. They are particularly suitable for the coating of paper of relatively low weight, such as LWC or LLWC papers. The coating is carried out by means of suitable devices such as air-brush coating machines, "Gravure Coater", "Blade Coater", film presses or size presses, using known methods.

For economic reasons, efforts are made to use thin printing papers for printed products having long print runs, for example for periodicals or mail order catalogs. However, this gives problems in respect of the opacity, i.e. in printing there is an interfering showing-through of the print on the other side of the paper. To prevent this effect, the fine aqueous dispersions produced by the process of the invention are applied to the paper. Depending on the choice of application system and the type of paper selected, the fine aqueous dispersion is diluted to lower solids contents. It has thus been found that it is advantageous, when using size presses, to adjust the fine dispersion to a total solids content in the range between 7 and 9% by weight, based on the anhydrous fine dispersion. When using film presses, it is advantageous to adjust the fine dispersion to a total solids content in the range from 19 to 22% by weight, based on the anhydrous fine dispersion.

It has been found that the fine dispersions can also be used as additive for pigmented coating compositions of the conventional type in an amount of from 0.3 to 15% by weight, preferably from 1 to 2.5% by weight, based on the total dry content of the coating composition, with them being used as a replacement for the calcium stearate used as lubricant. Cationic coating compositions are preferred.

Besides the dilution of the fine dispersions, it is also possible to concentrate the fine dispersions by suitable measures, such as vacuum distillation, and to use them in this concentrated form for the coating of paper and cardboard. The fine dispersions of the invention produced by concentration preferably possess a total solids content of from 20 to 40% by weight, based on the anhydrous fine dispersion. It has been found that these concentrated fine dispersions can also be used as additive for pigmented coating compositions of a cationic or conventional type in an amount of from 0.3 to 15% by weight, based on the total dry content, with them being used as a replacement for the calcium stearate used as lubricant.

The paper and cardboard coated with the fine dispersions of the invention are glazed in a subsequent process step, with the glazing being carried out, if desired, with cooled rollers.

The advantages of the fine aqueous dispersion of the invention are that it can be produced with omission of the hitherto usual strong heating of the solution. For the fine dispersions of the invention, the amount of coating applied preferably lies within a range from 1.0 to 2.5 g/m$^2$, preferably from 1.4 to 2.1 g/m$^2$, on each side. The advantages which are achieved on printed articles using the fine dispersions of the invention are as follows: full toluene density, reduction in the strike-through and show-through of the printing ink, increase in definition and the depth of color, improvement of the color acceptance, increase in ink gloss and reduction in the "missing dots". For cardboard, which is often varnished after printing, the varnish consumption is reduced by the coating with the composition of the invention, it being possible to apply the fine dispersion of the invention directly onto the cardboard or onto one or more pigmented precoats.

Owing to their oleophilic surface properties, the fine dispersions of the invention can be preferably used in gravure printing and web offset printing.

GENERAL DIRECTIONS FOR PRODUCING THE FINE DISPERSION

Process A

The water-soluble cellulose ether is sprinkled into the calculated amount of aqueous medium while stirring at 30° C. with a propeller stirrer. To the clear solution, the precipitate is successively added at this temperature while stirring. Subsequently the mixture is homogenized with strong shearing using the Ultraturrax (manufactured by Jahnke und Kunkel) until a colloidal fine dispersion is obtained. The fine degree of dispersion is determined using a Malvern 2600 C (manufactured by: Malvern, England; type: laser light scattering device).

Process B

Water-soluble cellulose ether and precipitate are jointly introduced into the initially charged aqueous medium while stirring with a propeller stirrer. The dispersion is then, as in process A, sheared until a colloidal dispersion is obtained. The fine degree of dispersion is determined as in process A.

TABLE V

| | (Data in % by weight) | | | |
|---|---|---|---|---|
| Example | 1 | 2 | 3 | 4 |
| Process | A | A | A | A |
| Precipitate[1] | 50 | 65 | 55 | 59 |
| HEC[2] | | 2.21 | | 0.75 |
| MHEC[3] | 1 | | | |
| Na—CMC[4] | 1 | | | |
| Starch ether[5] | | | 1.87 | 1.25 |
| Preservative[6] | 0.1 | 0.1 | 0.1 | 0.1 |
| Optical whitener[7] | 0.03 | 0.03 | 0.03 | 0.03 |
| Water | to 100 | to 100 | to 100 | to 100 |

[1] Prepared from Na-bentonite and distearyldimethyl-ammonium chloride, solids content 20% by weight
[2] Hydroxyethylcellulose ether, granular, standard etherification (MS = 0.5–0.7), viscosity: 20 mPa · s (measured using Höppler viscometer, 2% strength aqueous solution, 20° C.)
[3] Methylhydroxyethylcellulose ether, granular, standard etherification (AS = 0.5–0.7), viscosity: 300 mPa · s (measured using Höppler viscometer, 2% strength aqueous solution, 20° C.)
[4] Carboxymethylcellulose ether, granular, standard etherification (AS = 0.5–0.7), viscosity: 300 mPa · s (measured using Höppler viscometer, 2% strength aqueous solution, 20° C.)
[5] here: ® Solvitose H4
[6] here: ® Mergal K9N (manufactured by: Hoechst AG)
[7] here: ® Blancophor liquid (manufactured by: Bayer AG)

Coating, Glazing and Printing Test

An SC paper (about 10% by weight of pulp, about 21% by weight of filler) is coated with the fine dispersion of Example 2. The coating is carried out by means of a "Gravure Coater" ("Multi-Coater" having a contrarotating gravure roller, uptake of coating composition: about 33 ml/m$^2$). The base paper is coated on both sides. The application facility is directly followed by the drying of the coated paper. The paper is glazed prior to the printing test (Table VI).

TABLE VI

| Experiment No. | Speed [m/min] | Rule pressure [KN/m] | Roller temperature [°C.] |
|---|---|---|---|
| A0 | 200 | 300 | 90 |
| A1/A2 | 200 | 225 | 45 |
| A3/A4 | 200 | 225 | 45 |
| A5/A6 | 200 | 225 | 45 |

The glazed SC raw paper (A0) possesses a weight of 40 g/m$^2$. Table VII specifies the coatings carried out

| Experiment No. (Coating) | Length of paper [m] | Weight applied [g/m²] Front (outside) | Weight applied [g/m²] Reverse (inside) | Weight of paper [g/m²] |
|---|---|---|---|---|
| A0 | ca. 12,000 | — | — | 40 |
| A1 | ca. 12,000 | 2 | | 44 |
| A2 | ca. 12,000 | | 2 | |
| A3 | ca. 12,000 | 2 | | 42 |
| A4 | ca. 12,000 | — | | |
| A5 | ca. 12,000 | 1 | | 42 |
| A6 | ca. 12,000 | | 1 | |

TABLE VIII

In the printing test, the results shown in Table VIII are obtained.

| Coating | Weight of paper [g/m²] | White-ness | Opacity | Permeability to air | Beck smoothness outside | Beck smoothness inside | Gloss outside longi-tudinal | Gloss outside trans-verse | Gloss inside longi-tudinal | Gloss inside trans-verse | Ink gloss outside | Ink gloss inside |
|---|---|---|---|---|---|---|---|---|---|---|---|---|
| A0 | 40 | 64.3 | 87.3 | 42 | 893 | 852 | 25.4 | 22.3 | 26.1 | 21.4 | 61.1 | 32.8 |
| A1/A2 | 44 | 63.9 | 88.2 | 9 | 857 | 033 | 37.3 | 30.6 | 35.8 | 30.1 | 60.3 | 31.3 |
| A3/A4 | 42 | 65.7 | 89.4 | 20 | 648 | 345 | 39.3 | 24.5 | 24.7 | 13.0 | 59.3 | 19.1 |
| A5/A6 | 42 | 66.1 | 09.9 | 28 | 602 | 446 | 26.4 | 21.6 | 20.7 | 18.1 | 59.9 | 23.3 |

We claim:

1. A fine aqueous dispersion consisting essentially of
   a sheet silicate capable of ion exchange combined with a quanternary organic onium salt to form an organophilic sheet silicate and
   from 3 to 30% by weight, based on the organphilic sheet silicate, as anhydrous organphilic sheet silicate, of a water-soluble natural polymer and/or a salt, ether or ester thereof.

2. A fine aqueous dispersion as claimed in claim 1, wherein the sheet silicate capable of cation exchange comprises montmorillonite, hectorite, saponite, sauconite, beidellite, nontronite and/or bentonite.

3. A fine aqueous dispersion as claimed in claim 1, wherein the quaternary organic onium salt comprises a compound of the formula
   $(NR^1R^2R^3R^4)^+A^-$, in which
   $R^1$ and $R^2$ are $C_8$–$C_{22}$-alkyl, $C_8$–$C_{22}$-alkenyl or benzyl,
   $R^3$ and $R^4$ are $C_1$–$C_4$-alkyl or $C_1$–$C_4$-hydroxyalkyl and
   $A^-$ is an anion.

4. A fine aqueous dispersion as claimed in claim 1, wherein the water-soluble, natural polymer and/or the salt, ether or ester thereof is a cellulose ether, a starch ether, a guar gum salt, ether or ester, a xanthan gum salt, ether or ester and/or an alginate.

5. A fine aqueous dispersion as claimed in claim 4, wherein the salt, ether or ester of the water-soluble, natural polymer comprises a water-soluble cellulose ether possessing a mean molecular weight between 5,000 and 500,000 and a viscosity between 10 and 500,000 mPa.s, measured as a 2% strength aqueous solution in distilled water using a Höppler falling sphere viscometer at 20° C.

6. A fine aqueous dispersion as claimed in claim 5, wherein said viscosity, measured in the same manner, is between 20 and 150,000 mPa.s.

7. A fine aqueous dispersion as claimed in claim 1, which comprises from 12 to 17% by weight of a water-soluble, natural polymer and/or a salt, ether or ester thereof, based on the total weight of the anhydrous organophilic sheet silicate.

8. A fine aqueous dispersion as claimed in claim 1, wherein the mean particle size of the organophilic sheet silicate is less than 20 μm.

9. A fine aqueous dispersion as claimed in claim 8, wherein the mean particle size of the organophilic sheet silicate ranges from 5 to 0.5 μm.

10. Paper or cardboard, coated on one or both sides with the fine aqueous dispersion as claimed in claim 1.

11. Paper or cardboard as claimed in claim 10, wherein the amount of fine aqueous dispersion applied is equal to or less than 2 g/m².

12. A coating composition for paper or cardboard comprising a fine aqueous dispersion as claimed in claim 1, an optical whitener or pigment, and, optionally, a disinfectant.

13. A method for lubricating an optionally cationic coating composition comprising the step of adding a fine aqueous dispersion as claimed in claim 1 to said coating composition.

14. A process for producing a fine dispersion of an organophilic sheet silicate in an aqueous medium, starting from a water-containing precipitate of a sheet silicate capable of cation exchange and a quaternary organic onium salt, which comprises stirring the precipitate into a clear aqueous solution of a water-soluble, natural polymer and/or a salt, ether or ester thereof at a temperature of up to 50° C., or stirring the precipitate and the water-soluble natural polymer and/or the salt, ether or ester thereof simultaneously into the aqueous medium at a temperature of up to 50° C.

15. A process as claimed in claim 14, wherein the alternative stirring steps are conducted at a said temperature of at least 20° C.

16. The process as claimed in claim 15, wherein the alternative stirring steps are conducted at a temperature range of from 20° C. to 30° C.

17. The process as claimed in claim 14, wherein the temperature range is between 30° C. and 45° C. while stirring.

* * * * *